Feb. 3, 1953  G. W. HOWARD  2,627,216
CROSSROW PLANT BLOCKING MACHINE
Filed Feb. 15, 1947  4 Sheets-Sheet 1
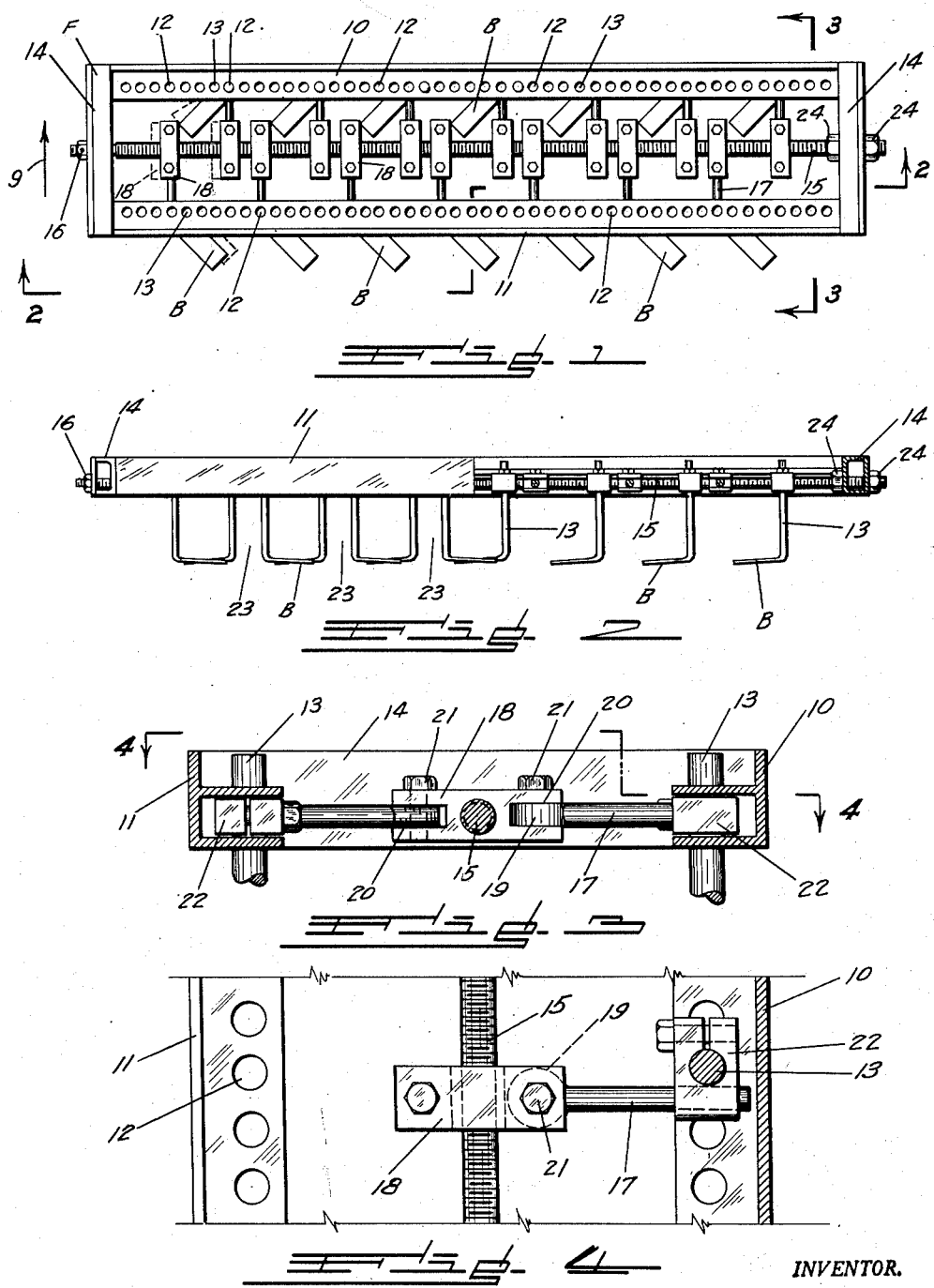
INVENTOR.
Graham W. Howard
BY
ATTORNEY

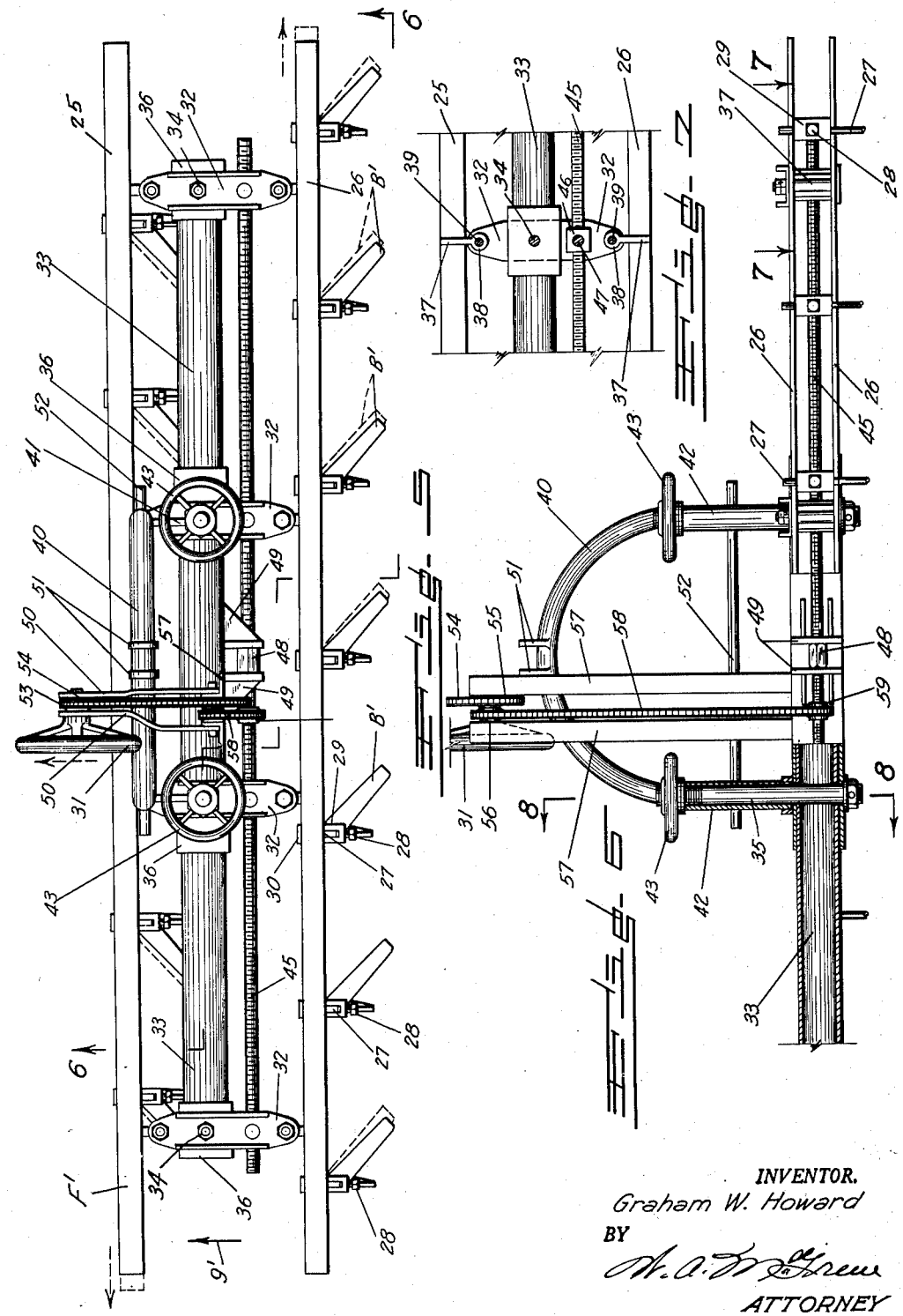

Feb. 3, 1953 G. W. HOWARD 2,627,216
CROSSROW PLANT BLOCKING MACHINE
Filed Feb. 15, 1947 4 Sheets-Sheet 3
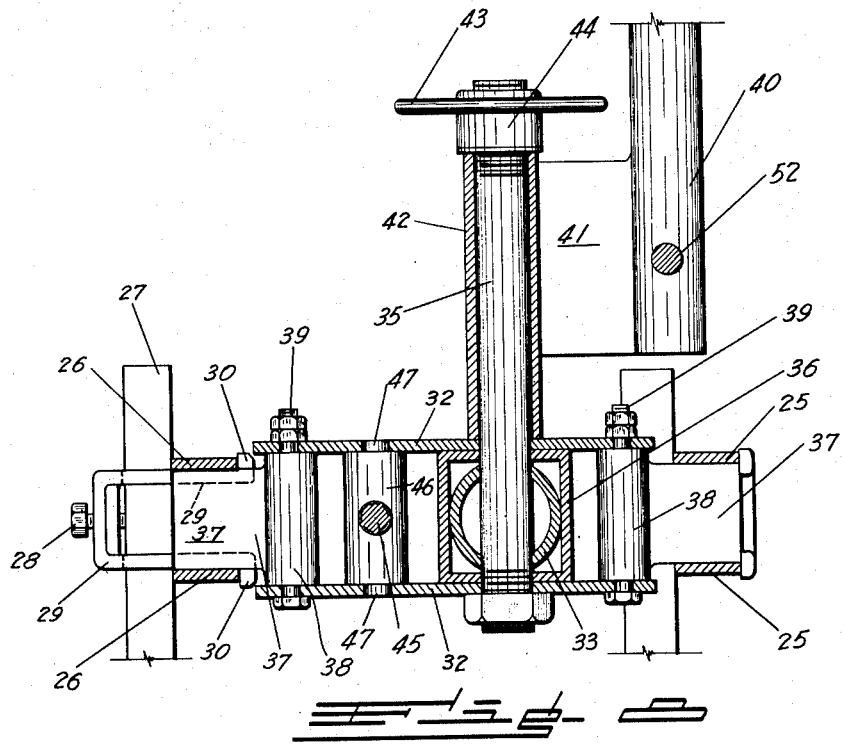
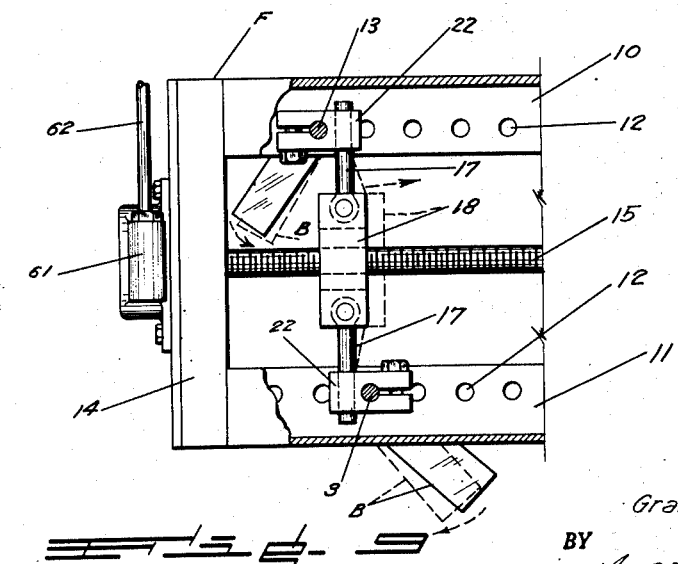
INVENTOR.
Graham W. Howard.
BY
ATTORNEY

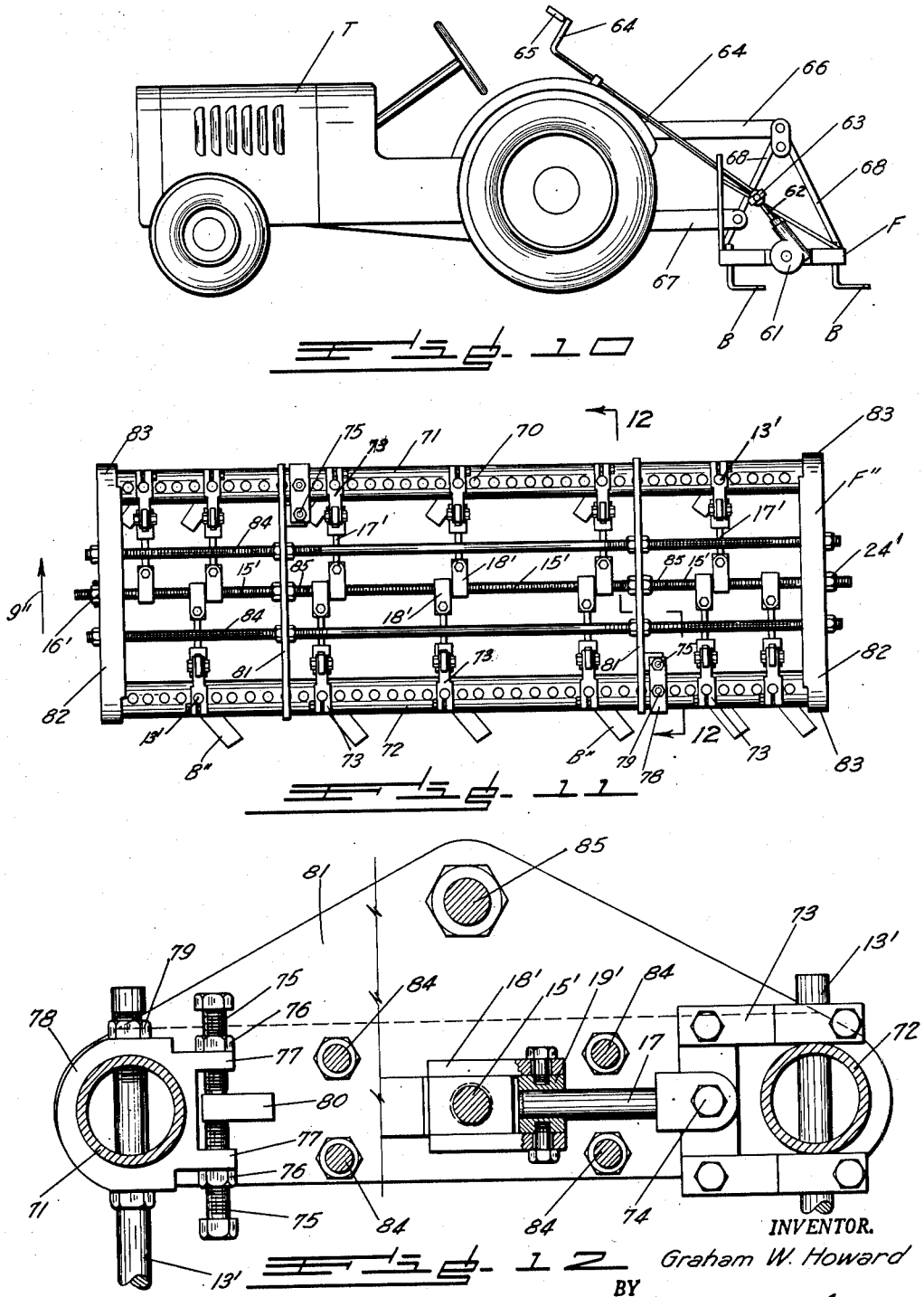

Patented Feb. 3, 1953

2,627,216

UNITED STATES PATENT OFFICE 2,627,216

CROSSROW PLANT BLOCKING MACHINE

Graham W. Howard, Fort Collins, Colo.

Application February 15, 1947, Serial No. 728,918

8 Claims. (Cl. 97—23)

This invention relates to agricultural apparatus, and more particularly to an apparatus for blocking or thinning row crops, such as sugar beets and the like. This invention also relates to a method of row crop blocking and the like.

Normally, a considerably greater number of seeds are placed in the ground, during the planting of sugar beets and the like, than would be necessary to produce the number of plants which the field can accommodate when the plants are fully grown, if full germination took place. This excess number of seeds insures adequate germination, since a percentage of the seeds normally do not produce plants, but usually germination in varying degrees of excess takes place in most rows or portions of a row. It is therefore customary, when the plants reach a predetermined height, such as up to six inches, for example, to block or thin out the beets, in which operation all of the plants are removed from predetermined spaced portions of the row. Of course, after the plants have grown somewhat higher, the spaced portions of the row in which the plants have been left growing are again thinned out, so as to leave only the desired number of plants, to provide sufficient ground space for each plant remaining to develop as fully as possible. Previously, the blocking operations (particularly in the case of sugar beets) were carried out by hand—time consuming and backbreaking work. Such work has been performed by a very low class of unskilled labor, and therefore obtainable at a relatively low wage. The capacity of one worker to block or thin a predetermined portion of a row is quite limited, and such hand operations are therefore economically feasible only as long as the wage paid is low in proportion to the return to the grower. Thus, any considerable increase in the cost of labor for blocking and thinning reduces considerably the margin of profit for the grower.

Among the objects of this invention are to provide a novel agricultural method of and apparatus for blocking operations and the like, as on sugar beets and similar plants; to provide such a method and apparatus which are especially effective in operation and which may be carried out or used economically; to provide such a method and apparatus which are capable of adjustment to accommodate differences in the heaviness of the plant growth, i. e. to change the widths of the spaced sections of a row from which the plants are blocked or removed; to provide such a method and apparatus which, in use, has the effect of cultivating between growing plants in a cross-row operation; to provide such an apparatus which may be mounted upon a tractor or the like, to insure maximum productivity; to provide such apparatus in which the adjustment of the section widths may be made during operation; to provide such apparatus which may take one of several forms, with variations in the more detailed elements of each; to provide such apparatus which is sufficiently simple for easy operation yet sturdy in construction and therefore able to withstand the rigors of hard abuse and continued operation; to provide such apparatus in which the depth at which removal takes place may be changed; and to provide various forms of the apparatus by which numerous other adjustments may be made. Other objects and the novel features of this invention will become apparent from the description which follows.

In accordance with the novel method of this invention, beets or other row crops are blocked by moving a plurality of spaced cutting blades simultaneously across the plant rows. The direction of movement is preferably perpendicular to the plant rows, so that the same spacing will occur in each row. The blades may be disposed in two sets—a front set and a back set—and variations in the width of the spaced sections may be obtained by changing the position of the front set of blades laterally with respect to the rear set of blades, or vice versa, or moving the blades pivotally for adjustment.

Three embodiments of agricultural apparatus, particularly adapted to carry out the above method, and further constructed in accordance with this invention, are illustrated in the accompanying drawings, in which:

Fig. 1 is a top plan view of apparatus constructed in accordance with this invention and forming a first embodiment thereof;

Fig. 2 is a rear elevation of the embodiment of Fig. 1, taken partly in offset section along line 2—2 of Fig. 1;

Fig. 3 is a transverse section taken along line 3—3 of Fig. 1;

Fig. 4 is a partial top plan view, taken partly in offset section along line 4—4 of Fig. 3;

Fig. 5 is a top plan view of apparatus comprising a second embodiment of this invention;

Fig. 6 is a rear elevation, taken partly in offset section along line 6—6 of Fig. 5;

Fig. 7 is a partial horizontal section taken along line 7—7 of Fig. 6;

Fig. 8 is a vertical section taken along line 8—8 of Fig. 6;

Fig. 9 is a partial top plan view, partly broken away, of the apparatus of Fig. 1 provided with a device for adjustment during operation;

Fig. 10 is a side elevation of the modified apparatus of Fig. 9 and a tractor on which the same is mounted;

Fig. 11 is a top plan view of apparatus forming a third embodiment of this invention; and Fig. 12 is an offset vertical section taken along line 12—12 of Fig. 11.

Referring to Figs. 1 and 2, the first embodiment of this invention comprises a framework F on which are mounted a plurality of blades B, which remove spaced sections of plants as the apparatus is moved across the rows in the direction of the arrow 9, the apparatus being mounted on a tractor or the like in a suitable manner, such as hereinafter described. The framework F includes front and rear channels 10 and 11, respectively, and the upper and lower webs of each channel are provided with a plurality of holes 12, through which supporting posts 13 of blades B extend. Each post 13 may be made integral with the blade, or may be attached thereto in a suitable manner, as by welding. Also, each blade B may be attached to a post 13 by a swivel joint, for adjustment of the blade about a horizontal axis extending laterally of the machine. The framework F is completed by end channels 14, welded or otherwise suitably attached, to front and rear channels 10 and 11, respectively. A screw 15 is mounted to extend laterally in the framework and is adapted to be turned, as through a cottered nut 16, to adjust the horizontal angularity of blades B, and thereby change the width of the spaced sections from which plants are removed.

For such adjustment, and referring also to Figs. 3 and 4, each post 13 is attached by a link 17 to a threaded block 18 which engages screw 15. Each link 17 is welded or otherwise formed substantially integrally with a knuckle 19 which is received by a slot 20 in block 18, which may be dual in nature and thereby provided with another slot 20 on the opposite side, for a purpose hereinafter described. Each link 17 is adapted to pivot about a pin 21 when block 18 is moved laterally by screw 15, and the latter movement also causes post 13 to pivot in holes 12. The other end of link 17 is attached to post 13 by a clamp 22, which also enables each blade B to be initially adjusted to any predetermined angular and vertical position desired.

As will be evident from Figs. 1 and 2, the blades B are operated in pairs, one front blade and one rear blade forming each pair. As in Fig. 1, the front blades are slanted rearwardly to the left while the rear blades are slanted rearwardly to the right. The blades B may be sharp along the leading edge only, or may be "duckfoot" blades which are sharp on both edges, so that a more equalized draft is obtained. As in Fig. 2, the blades are preferably adjusted so that they move along, or just beneath, the ground level, so that all plants in the "removal" spaces, i. e. between the posts 13 of each pair of blades, will be removed, while the plants in a "standing" space 23 (between the post 13 of a rear blade and the post 13 of the front blade of the next adjacent pair) will be left standing.

To increase the width of the "removal" spaces, and decrease the width of the "standing" spaces, the screw 15 is turned to move the blocks 18 to the left, to cause the front blades to rotate in a clockwise direction and the rear blades to rotate in a counter-clockwise direction, such as indicated by the dotted positions of the blocks 18 and blades B at the left in Fig. 1. To adjust the blades reversely, the screw 15 is turned in the opposite direction, i. e., to move the blocks 18 to the right. A further adjustment may be obtained by mounting the posts 13 of each pair of blades in holes 12 opposite or more nearly opposite each other. The more nearly the blades approach a position parallel to the channels 10 and 11, respectively, the greater distance the end of each blade will extend past the rod 13 of the opposite blade of the pair.

The adjustment of screw 15 of Figs. 1 to 4 may be made by loosening lock nuts 24 at one end of the framework F, and turning the screw by means of cottered nut 16. After the blades B have been adjusted to the new position, the lock nuts 24 are retightened to maintain the blades in the adjusted position.

In the second embodiment, illustrated in Figs. 5 to 8, instead of adjusting the blades to move pivotally, the front and rear sets of blades may each be moved as a series laterally, so as to narrow or widen the effective width, or "removal" space, of a pair of blades. Thus, as in Fig. 5, blades B' may be fixedly mounted on front and rear pairs of plates 25 and 26, respectively, of a framework F'. Each blade B' may be mounted on, or formed integrally with, a supporting bar 27 which, as in Figs. 5 and 8, is clamped against the rear edge of plates 25 or 26 by a cap screw 28 and a slotted U-clamp 29, the latter having outwardly projecting toes 30 at its opposite end to bear against the front edge of the plate. In this construction, the blades B' are constructed so as to maintain a predetermined angle with respect to the direction of movement indicated by arrow 9' of Fig. 5, such as about 135°, i. e. about 45° with respect to plates 25 or 26. The front and rear sets of blades are preferably adjusted simultaneously, and also preferably through a handwheel 31, as described below, which may be operated during movement of the machine across a field during a blocking operation, so that the operator may make adjustment for variation in the thickness of growth of the plants.

Framework F' includes several pairs of links 32, such as four, for supporting the front plates 25 and rear plates 26 from a principal lateral member, such as a pipe 33, it being understood that other structural shapes may be utilized in lieu of pipe 33, if desired. Links 32 are also mounted for horizontal pivotal movement on pipe 33, the outer sets of links 32 being pivotal about smaller bolts 34, while the inner links 32 are pivotal about assembly bolts 35. Also, a stabilizing box 36 is welded to pipe 33 at the position of each pair of links 32. As in Figs. 7 and 8, a supporting web 37 is welded or otherwise suitably attached to the upper and lower plates 25, and also plates 26, at a plurality of points corresponding to links 32. Each web 37 is provided at one end with a journal 38, attached thereto in a suitable manner, preferably by welding, while a pin 39 extends through each journal 38 and is attached to and mounted between the upper and lower links 32. Pins 39 permit a relative movement of the plates 25 and 26, in opposite directions, with respect to pipe 33, when links 32 are pivoted about pipe 31, on bolts 34 or 35.

Pipe 33 is attached by assembly 35 to a support comprising a U-shaped tubular bracket 40 having attached thereto, as by welding, a plate or web 41 at the lower end of each leg thereof, each web 41 being welded to a relatively short tube 42, as in Fig. 8. Each assembly bolt 35 passes not only through pipe 33 but also through tube 42, and may be tightened by means of a small handwheel 43 attached to a nut 44.

To cause the links 32 to pivot, and thereby move the front and rear plates 25 and 26, respectively, as from the full to the dotted positions of Fig. 5, and at the same time move the blades B' from the full to the dotted positions of Fig. 5, a screw 45 extends parallel to pipe 33 and, as in Figs. 7 and 8, engages a threaded block 46 provided with pins 47 at the upper and lower ends thereof, which engage suitable holes in links 32. The screw 45 is prevented from moving axially with respect to pipe 33, as in Fig. 5, by a hexagonal block or nut 48, disposed between a pair of brackets 49, which are welded or otherwise suitably attached to pipe 33. Block 48 is keyed or cottered to screw 45, and also may be used to turn screw 45 for manual adjustment of the blades B'.

As indicated previously, adjusting means including handwheel 31 is provided, which permits the spacing of blades B' to be adjusted during operation. Thus, handwheel 31 is mounted on a pair of brackets 50, in a position convenient to the operator of a tractor, for instance. The apparatus may be mounted on the rear of the tractor, as through attachment to a pair of ears 51 at the upper end of bracket 40, and also to the ends of a supporting and bracing rod 52, which extends through the bracket 40 adjacent the lower ends of the legs thereof.

Handwheel 31 is connected with screw 45 by a chain and sprocket assembly, or any other suitable reduction device. Thus, the assembly may include a sprocket pinion 53 coaxial with and turned by handwheel 31, and a chain 54 which extends over pinion sprocket 53 and also over a large sprocket 55, to provide the desired power reduction. Sprocket 55 is coaxial with and turns a second sprocket pinion 56, the two being mounted at the upper end of and between a pair of brackets 57, which extend upwardly from pipe 33 and to the upper ends of which brackets 50 for handwheel 31 are also attached. A second chain 58 extends over pinion sprocket 56 and a second pinion sprocket 59, which is mounted on screw 45 to rotate the latter.

The adjustment of the blades B' during a blocking operation usually does not require a particularly fast movement of the blades, and thus may be done relatively gradually, so that the reduction between handwheel 31 and screw 45 while insuring that the force required to effect the adjustment is small, does not unduly slow the operation. As will also be evident, the small handwheels 43 may be used to adjust the compression exerted on links 32 against a box 36, so that if considerable adjustment is necessary in particular rows, the small handwheels 43 may be loosened slightly to render such adjustment easier, but if little or no adjustment will be necessary, small handwheels 43 may be tightened so that there is little chance of the blades B' becoming accidentally moved from position.

Changes and/or additions to the first embodiment may be made, such as shown in Figs. 9 and 10, so that adjustment of blade position may be made by the operator during use, the apparatus being mounted on a tractor T. For such adjustment, a worm and gear reduction device 61 may be attached to one end of the framework F, and connected to screw 15, as in Fig. 9. The worm may be actuated by a shaft 62 which is connected by a universal joint 63 with an elongated crank 64, and handle 65 of crank 64 is positioned sufficiently close to the seat of the operator of a tractor T, so that the crank handle 65 may readily be turned to adjust the width of the spaced sections in which the plants are removed.

A suitable manner in which the apparatus of the first embodiment may be supported from a tractor or the like is indicated in Fig. 10. Thus, an upper pair of parallel bars 66 and a lower pair of parallel bars 67 (only one bar of each being shown) extend rearwardly from the tractor T and are pivotally attached to a pair of braces 68 which, with framework F, form a triangular arrangement. The upper bars 66 are pivotally attached to the upper ends of braces 68, while the lower bars 67 are pivotally attached to the midpoint of the front braces 68. Also, either pair of supporting bars 66 or 67 may be attached in a suitable manner to the conventional hydraulic lifting mechanism of the tractor T, to raise the apparatus when traveling from field to field, or the like.

As is also shown in Fig. 9, in lieu of one blade B being operated by each block 18, as in Figs. 1 to 4, two blades B are controlled by each block 18, which is thereby utilized as a dual block, but is otherwise identical with block 18 of Figs. 1 to 4. It will be understood, of course, that each block 18 may control one blade of two different pairs, as well as the two blades of one pair.

In another embodiment of this invention, illustrated in Figs. 11 and 12, the blades are pivotally adjustable, as in the first embodiment, to vary the width of the spaced sections from which the plants are removed, and in addition the front and rear sets of blades are independently adjustable, as about a longitudinal axis, to change the angle at which the blades extend toward or into the ground. The blades B'' of Figs. 11 and 12 (which may be similar to the blades B of Figs. 1 and 2) are similarly mounted on posts 13', which extend through selected holes 70 in front and rear pipes 71 and 72, respectively, of framework F'', pipes 71 and 72 being pivotal in framework F'', as hereinafter described. The blades B'' are movable pivotally with posts 13' by a screw 15', which is provided with a cottered nut 16' at one end and lock nuts 24 at the opposite end, as in the first embodiment. Similarly, blocks 18' may be threaded on screw 15', but a link 17' connects each block 18' with a clamping yoke 73 adapted to be tightened on post 13', both above and below pipe 71 or 72, as in Fig. 12. A pivotal connection formed by a knuckle 19' permits block 18' to move along screw 15' to cause posts 13' to pivot in holes 70. In addition, each link 17' is attached pivotally about a horizontal axis to yoke 73, as by a pin 74, so that the operation of the links will not be interfered with, when the angle of blades B'' with respect to the ground is adjusted by tilting or twisting pipe 71 or 72 in framework F''.

Tilting or twisting pipes 71 and 72 is accomplished by adjustment of cap screws 75, which may be locked in adjusted position by nuts 76. Cap screws 75 extend through threaded holes in ears 77, extending from a substantially circular block 78 attached to pipe 71 or 72 by a bolt 79, and cap screws 75 also bear against opposite sides of a fixed plate 80, which is attached to a central vertical web 81. By adjusting the position of cap screws 75, either pipe 71 or 72, or both, may be twisted or rotated through a small arc to provide the desired horizontal angular adjustment of the blades B. This horizontal angular adjustment is of advantage when the front and rear blades are set at different drafts or depths and the resulting action tends to continuously move the machine sidewise. By tilting the blades with respect to the horizontal, particularly through adjustment of cap screws 75, the front or rear set of blades, or both, may be adjusted to counteract such side draft.

Central webs 81 and flanged end caps 82 comprise the vertical portions of framework F'', while webs 81 are provided with suitable holes through which pipes 71 and 72 pass, and a curved flange 83 is formed on each cap 82 to provide a socket for the ends of the pipes. Also, screw 15' passes through suitable holes in webs 81, and is fastened to end caps 82 in the manner previously described. Webs 81 and caps 82 are attached together by four bolts 84 extending longitudinally in spaced positions, to each side of and above and below screw 15'. In addition, the upper ends of webs 81 are connected by a lifting rod 85, by which the apparatus may be attached to a tractor or the like, in a manner similar to that illustrated in Fig. 10. Thus, the upper parallel bars 66 of Fig. 10 may be attached to rod 85, and the lower bars 67 may be attached to the front of webs 81. (Such a manner of attachment is believed obvious, and therefore unnecessary to illustrate.) Also, for adjustment from the tractor, a pinion may be mounted on screw 15', and a ratchet and lever used to turn the pinion and screw, the lever being operable from the tractor or the like.

From the foregoing, it will be apparent that the method and apparatus of this invention fulfills to a marked degree the objects and requirements hereinbefore set forth. The method of this invention is productive of greatly beneficial results. When the blades or cutting implements are moved transversely of the rows, not only are the rows blocked, i. e. desired portions of the growing plants are removed, but also weeds or other undesirable plant life between the rows and in the path of the blades are removed. Furthermore, subsequent to the blocking operation, the apparatus of this invention may be utilized for cross-row cultivating or weeding, thereby removing undesirable plant life which may have started growth in the meantime in the spaces in the row from which the plants were removed during the blocking operation. Such undesirable plant life in the rows is not removed by the usual cultivating operations, wherein a cutting implement is moved lengthwise of the rows, to remove undesirable plant life between the rows.

As above indicated, the apparatus of this invention may be used for other purposes than the blocking method of this invention. Depending upon the frequency of adjustment required, and also the number of adjustments to be made, the machine may be relatively simple, as in the embodiment illustrated in Figs. 1 to 4, or may include additional features, as in the embodiments illustrated in Figs. 5 to 7 and 11 to 12. In addition, the blades may be either pivoted in pairs, as in the first and third embodiments, or the front and rear sets may be movable bodily in a lateral direction with respect to each other, as in the second embodiment of Figs. 5 to 8. The manner of adjusting the angularity, or other positions of the blades may be manual, as in the first and third embodiments, or it may be accomplished during operation of the machine, as in the second embodiment and the modification of the first embodiment illustrated in Figs. 9 and 10.

It will be understood that various changes in addition to those indicated may be made; that the method of this invention may be carried out by machines which differ in structure, but not in essential features of operation, from those shown and particularly described herein; that the various embodiments of this invention are merely intended to be illustrative, and are not to be construed as limitations upon this invention; and that various other changes may be made, all without departing from the spirit and scope of this invention.

What is claimed is:

1. A cross row blocker comprising a frame having means for its attachment to a vehicle; said frame having front and rear members, a series of blocking knives mounted in spaced positions on said frame members and each having oppositely inclined cutting surfaces arranged at a suitable cutting angle, said knives being mounted for limited rotation about two axes to vary the spacing of the cutting surfaces and the cutting angle of said knives; and means on said frame for rotating all of said knives in unison about at least one said axis, the direction of rotation of the knives on the front frame member being opposite to the direction of rotation of the knives on the rear frame member.

2. Apparatus for blocking row crops and the like comprising movable supporting means; a plurality of cutting blades adapted to be mounted in spaced relation on said supporting means and also in position to sever or remove plants from spaced areas over which said supporting means is moved; means for mounting said blades in such position and in two sets, a front set and a rear set; and means for bodily moving said front and rear sets laterally with respect to the direction of movement and relatively to each other to change the width of the paths cut by said blades.

3. Apparatus for blocking row crops and the like comprising movable supporting means; a pair of supports pivoted about horizontal axes and extending transversely of said supporting means; a plurality of cutting blades adapted to extend generally horizontally and attached solely to posts mounted for pivotal movement about vertical axes and in spaced relation on said supports and also in position to sever or remove plants from spaced areas over which said supporting means is moved; said blades being disposed in two sets, a front set and a rear set mounted on the front and rear supports, respectively; means including a screw movably connecting all of said blades for pivotally moving said blades simultaneously about said vertical axes; and means including a screw connected with said supports for pivotally moving the supports about said horizontal axes to change the horizontal inclination of said blades.

4. Apparatus for blocking row crops and the like, comprising a framework having front and rear parallel bars, each provided with a plurality of spaced vertical holes, and end bars attached to said front and rear bars; means for mounting said framework on a tractor or the like, including supporting bars adapted to be attached at one end to a tractor or the like and pivotally attached at the opposite end to braces, said braces extending downwardly and in turn being attached to said framework; a plurality of cutting blades adapted to extend in a general horizontal direction but inclined with respect to the direction of movement of said framework, said blades being mounted on posts extending upwardly in spaced positions through predetermined spaced holes in said front and rear bars, the blades mounted on said front bar being inclined rearwardly and to one side, with the blades mounted on said rear bar being oppositely inclined, said blades also being so mounted that a front blade cooperates with a rear blade substantially to the rear thereof to define the width of an area from which plant growth or the like is removed upon movement of said apparatus transversely across a row of crops or the like; an adjusting screw extending transversely of said framework; a reduction device for turning said screw and provided with an actuating handle extending to a position convenient for an operator of said tractor or the like; a plurality of threaded blocks mounted on said screw; and links pivotally connected to said blocks and attached to said posts, for changing the pivotal positions of said blades when said screw is turned and said blocks move therealong.

5. Apparatus for blocking row crops and the like, comprising a framework which includes a central, transversely extending supporting member, and front and rear transversely extending bars; a plurality of links extending between said supporting member and said bars, each said link being pivoted on said supporting member and including a pivotal attachment to each said bar, each of said pivots being on a substantially vertical axis; a plurality of blades mounted on posts and adapted to be positioned in spaced relation on each of said bars, each said blade extending substantially transversely to its post and being provided with at least one cutting edge adapted to remove plant growth and the like from a predetermined area of a crop row; clamps for attaching said posts to said bars in spaced positions, with the blades mounted on the front bar being inclined rearwardly in one direction and the blades mounted on the rear bar being inclined rearwardly in the opposite direction, the front and rear blades comprising pairs, each pair cooperating to define a predetermined width of area over which plant growth is removed; a screw extending transversely of said framework alongside said supporting member and threadedly engaging said links; a bearing and associated means for preventing lateral movement of said screw, so that said links are caused to pivot and move said front and rear bars bodily when said screw is turned, to move the front and rear sets of blades and thereby change the effective spacing width of each said pair of blades; supporting means extending upwardly from said supporting member and adapted to provide for attachment of said framework to a tractor or the like; an adjusting wheel mounted adjacent the upper end of said supporting means; and a chain and sprocket reducing and transmitting device for turning said screw when said handwheel is turned.

6. Apparatus for blocking row crops and the like, comprising a framework having front and rear pipes extending transversely thereof and provided with vertically extending holes, end channels connecting said pipes and also permitting rotation of said pipes, vertically extending webs through which said pipes extend and disposed in spaced lateral positions, and stabilizing rods extending from end channel to end channel and attached to said webs; means extending between said webs for attachment of said framework to a tractor or the like; an adjusting screw extending between said end channels and passing through said webs; a plurality of blades having cutting edges adapted to remove plant growth and the like from predetermined spaced areas of crop rows as said apparatus is moved transversely of said rows, said blades being mounted on posts adapted to extend vertically through spaced holes in said front and rear pipes; a clamp attached to each post both above and below said pipe, for turning said post and thereby changing the lateral inclination of the blade mounted thereon; a series of blocks threadedly engaging said screw, for changing the pivotal position of said posts when said screw is turned and said blocks move therealong; a link pivoted at one end to each block about a generally vertical axis and at the opposite end pivoted to the corresponding post clamp about a generally horizontal axis; a ring clamped to each of said pipes adjacent one of said webs; a bearing plate attached to a web adjacent each said ring; and adjusting screws mounted on each said ring and bearing against opposite sides of said plate, for changing the pivotal position of each said pipe to vary the inclination of said blades with respect to the horizontal.

7. Apparatus for blocking row crops and the like comprising a frame having front and rear members, a screw extending across the frame between said members, spaced pairs of cutting knives secured to the frame, the front and rear member of each pair of knives cooperating to cut a single path, and means interconnecting said front and rear knives with the screw whereby all of said knives may be simultaneously moved to vary the width of the path cut by each pair of knives.

8. Apparatus for blocking row crops and the like as defined in claim 7 including means for securing the frame to a tractor or the like, and means operable by the operator of said tractor or the like for turning said screw to adjust the position of said knife during movement.

GRAHAM W. HOWARD.

REFERENCES CITED

The following references are of record in the file of this patent:

UNITED STATES PATENTS

| Number | Name | Date |
|---|---|---|
| 486,614 | Lindgren | Nov. 22, 1892 |
| 750,473 | Metz | Jan. 26, 1904 |
| 1,260,279 | Faudel | Mar. 19, 1918 |
| 1,267,645 | Estell | May 28, 1918 |

FOREIGN PATENTS

| Number | Country | Date |
|---|---|---|
| 551,138 | France | Dec. 27, 1922 |

OTHER REFERENCES

U. S. Dept. of Agriculture Leaflet No. 97; Cross-Blocking Sugar Beets by Machine, issued August 1933.